Dec. 29, 1953
G. E. BESZEDICS
2,664,540
AUTOMATIC REGULATOR OF HIGH SENSITIVITY FOR
REGULATING ALTERNATING CURRENT VOLTAGES
Filed Nov. 20, 1951
2 Sheets-Sheet 1
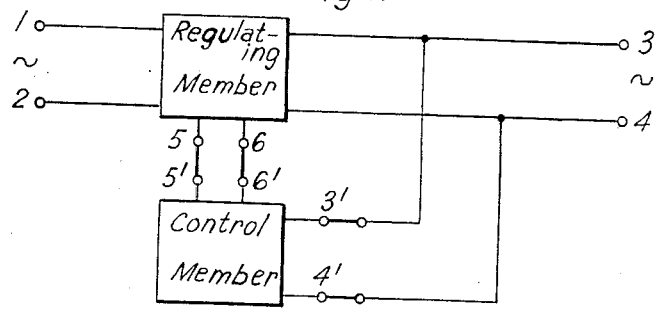
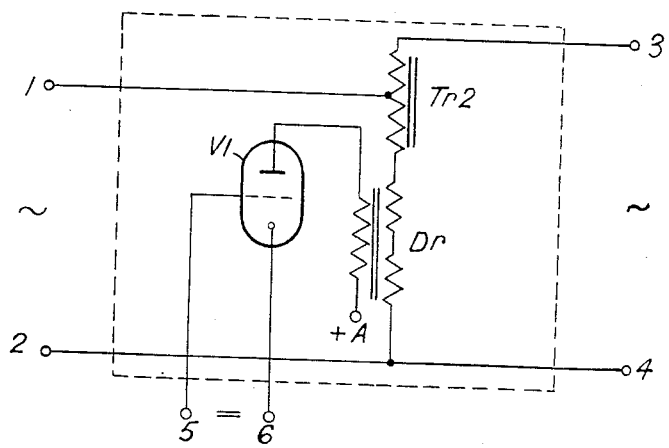
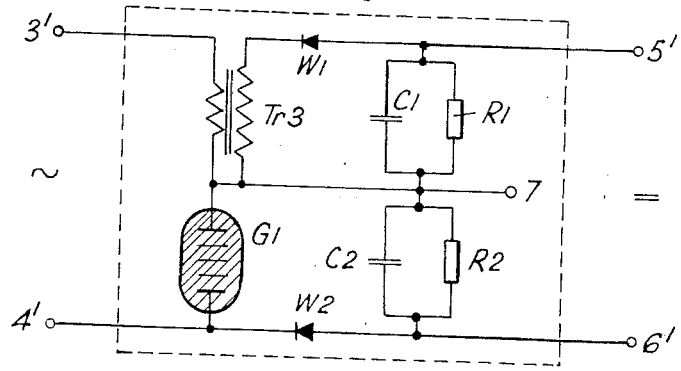
Inventor
G. E. BESZEDICS
By Philip M. Bolton
Attorney Patented Dec. 29, 1953

2,664,540

UNITED STATES PATENT OFFICE 2,664,540

AUTOMATIC REGULATOR OF HIGH SENSITIVITY FOR REGULATING ALTERNATING CURRENT VOLTAGES

Geza Emil Beszedics, Vienna, Austria, assignor to International Standard Electric Corporation, New York, N. Y., a corporation of Delaware Application November 20, 1951, Serial No. 257,220

Claims priority, application Austria November 21, 1950

2 Claims. (Cl. 323—22)

This invention relates to alternating voltage regulators, and in particular to an electrically operated regulator.

Generally alternating voltage regulators are utilized to prevent fluctuations in alternating voltages which may be caused either by the power supply itself or by the load. According to the prior art there are many types of mechanically or electrically operated alternating voltage regulators, however these regulators are usually encumbered by limited regulation accuracy.

Alternating voltage regulators usually comprise two members, the regulating member and the control member. The input side of the control member is connected to the output of the regulating member therefore any voltage fluctuations occurring at the output of the regulating member are received by the control member and converted in magnitude. The converted voltage is then led to the regulating member and controls the regulating member in such a way that it continues to operate as long as any small fluctuations remain.

It is a principal object of my invention to provide an automatic voltage regulator in which the control member, though employing only a few switching means, produces high regulation accuracy.

The above-mentioned and other features and objects of this invention and the manner of attaining them will become more apparent and the invention itself will be best understood, by reference to the following description of the embodiments of the invention taken in conjunction with the accompanying drawings, wherein:

Fig. 1 shows by block diagram the control member and the regulating member generally utilized in automatic voltage regulators;

Fig. 2 shows schematically one example of a regulating member utilizing a saturable choke coil;

Fig. 3 shows schematically a basic circuit diagram of a control member that is the subject of my invention.

Figure 4:
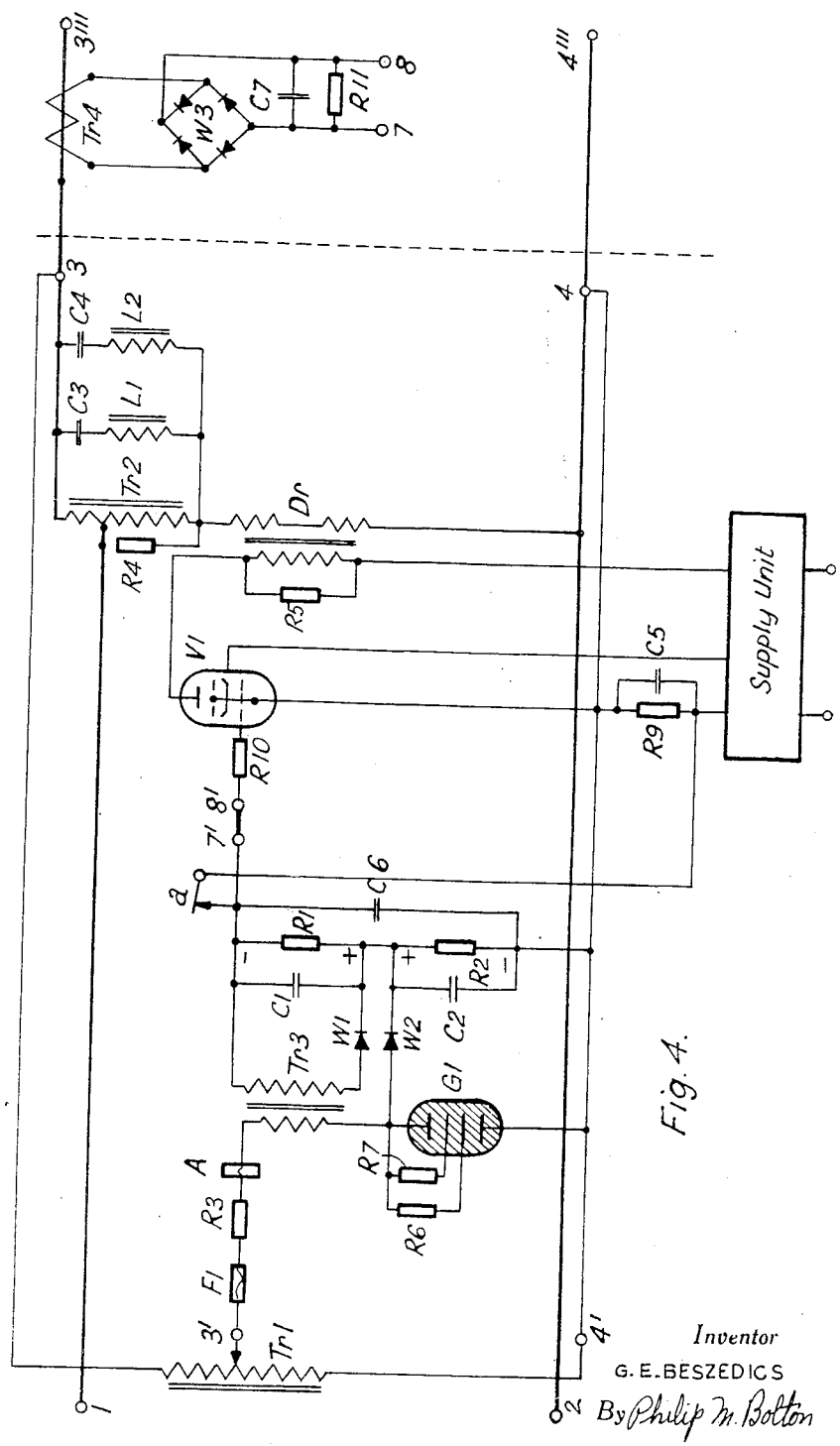
Fig. 4 shows schematically a complete circuit of the regulator and control members.

Referring to Fig. 1, the input side of terminals 3′ and 4′ of the control member is connected to the output terminals 3 and 4 of the regulating member. Any voltage fluctuations at the output 3, 4 of the regulating member are received by the control member and converted in magnitude. The converted voltage is then led to the regulating member via terminals 5, 6 and control the regulating member in such a way that it continues to operate as long as there are any fluctuations.

Referring now to Fig. 2 showing an example of a regulating member, the unregulated voltage is applied to the input terminals 1, 2. The regulated voltage, that is the voltage which is to be kept constant is taken from the output terminals 3, 4.

The regulating voltage is applied to terminals 5, 6 of the grid and cathode respectively, of tube V1. The magnetization of the coil Dr depends upon the regulating voltage fed to the plate of tube V1. Coil Dr represents a resistance that varies with the amount of magnetization. Since this coil Dr is in series with the primary winding of transformer Tr2, the voltage induced in the primary winding of said transformer will depend upon the magnetization of coil Dr.

The control member illustrated by Fig. 3, operates as follows: When a fluctuating alternating voltage is fed to discharge tube G1 it produces a violently fluctuating voltage in the neighborhood of the ignition voltage, if the generator resistance is relatively low. In transformer Tr3 these current fluctuations are converted into voltage fluctuations of such magnitude that, after they are rectified by rectifier W1 and compared with the voltage of the discharge tube, which is rectified by rectifier W2, a regulated voltage is produced in resistances R1 and R2 and appears at terminals 5′ and 6′. The change in this voltage is a multiple of the change in the alternating voltage fed to terminals 3′ and 4′.

If the form factor and the transformer and rectifier efficiencies are neglected, a simple calculation shows that the fluctuation amplification is mainly determined by the transformation ratio $u$ of transformer Tr3, as shown below.

The following notation will be used:

Voltage between terminals 3′ and 4′___ $ue$ (input voltage).
Voltage between terminals 5′ and 6′___ $ua$ (output voltage).
Voltage between terminals 3′ and 7___ $u1$ (primary voltage of Tr3).
Voltage between terminals 5′ and 7___ $u2$ (secondary voltage of Tr3).
Voltage between terminals 7 and 6′___ $ug1$ (voltage across discharge tube).
Transformation ratio of Tr3_____ $u=u1/u2$.

The fluctuation amplification $$\frac{\Delta ua}{\Delta ue}$$

is calculated as follows:

$$ua = u2 - ug1$$

and $$u2 = u1 \cdot u$$

where $$u_1 = u_e - u_{g1}$$
$$u_a = (u_e - u_{g1})u - u_{g1}$$

The following results after taking the differences:

$$\frac{\Delta u_a}{\Delta u_e} = 1 . u = u$$

If the input terminals (3' and 4') of the control member are connected to the regulated side of the regulating member (terminals 3 and 4), the output voltage of the regulating member is kept at a definite value.

In order to show the invention more clearly, the complete circuit of the regulator is represented in Fig. 4 and described in detail below. The unregulated voltage is fed to terminals 1 and 2 and appears in the primary side of transformer Tr2 and the secondary side of saturation coil Dr, which are connected in series. The primary voltage of transformer Tr2 which will produce the secondary voltage required for subsequent regulation depends on the magnetization of coil Dr.

Resistance R4, connected across the primary winding of transformer Tr2, serves to correct the phase angle. The purpose of series circuit C3, L1, and C4, L2 is to reduce the 3rd or 5th harmonic and thus decrease the harmonic content of the resulting voltage.

As is well known, the magnetization of coil Dr is dependent on the plate current of tube V1. The controlling voltage for tube V1 is fed over the protecting resistance R10 and is produced in the following manner. The voltage to be controlled at the output of the regulating member, which is to appear at terminals 3 and 4, is fed to terminals 3' and 4' by inserting in the circuit a voltage divider in the form of autotransformer Tr1. By changing the transformation ratio of transformer Tr1, it is possible to adjust the output voltage between two extreme values $U_{max}$ and $U_{min}$. The alternating voltage is fed to the primary winding of transformer Tr3, which is connected in series to multi-electrode glow-discharge tube G1, through fuse F1, resistor R3 and alternating-current relay A. R6 and R7 are the ignition resistors of discharge tube G1. The voltage on the secondary of transformer Tr3 is rectified by rectifier W1, the direct voltage is taken across resistor R1 and is smoothed out in condenser C1. The voltage across the discharge tube is likewise rectified by rectifier W2 and the direct voltage is taken across resistance R2. Condenser C2 as well as condenser C6, which is connected across R1 and R2, serve to smooth out the voltage. The voltages are subtracted by connecting resistors R1 and R2 one after the other, and they supply the required regulated voltage for tube V1.

The regulator operates as follows: If the output voltage at terminals 3 and 4 drops below the value to which it was adjusted, a smaller voltage is produced at terminals 3' and 4'. The smaller voltage is received by transformer Tr3 and the discharge tube and reduces the voltage across R1 and R2. As a result of this, the plate current of tube V1 rises, and flows through the primary winding of the saturation coil. This current increase decreases the resistance of the secondary side of the coil, thereby increasing the primary voltage of transformer Tr2, which opposes the voltage drop.

In the reverse case, in which the output voltage increases, the grid bias voltage of tube V1 increases, the plate current decreases, the coil resistance increases and the input voltage of transformer Tr2 is reduced. The latter voltage opposes the rise in the output voltage.

In order to balance out rather large load fluctuations, a direct voltage proportional to the current is produced by rectifier W3 across current converter Tr4. This voltage is smoothed out by condenser C7 and is fed to resistance R11 or to terminals 7 and 8. This direct voltage is led with the correct polarity to terminals 7' and 8' and is thus fed in series with the grid-bias voltage mentioned above. It is thus possible to smooth out even rather large load fluctuations.

The operating voltages for tube V1 are obtained by rectifying the alternating supply voltage in the usual manner, the alternating voltages being taken from the output of the regulating member so that said operating voltages can be held constant. The power supply is shown only in block form. Terminals 3" and 4" connect with terminals 3 and 4.

The following precautionary measures may be taken in order to prevent the output voltage of the regulating member from increasing as a result of disturbances.

If the discharge tube fails or if its circuit is opened, the control voltage across R1 and R2 becomes very positive or completely disappears and hence tube V1 receives either a positive grid-bias voltage or no grid bias voltage at all. This gives rise to a higher plate current, and coil Dr is magnetized in such a way that a high voltage is produced at terminals 3 and 4. The protective function of alternating current relay A is such that no current flows through it, and its contact $a$ applies an auxiliary grid bias voltage to tube V1. This auxiliary grid bias voltage is obtained across cathode resistance R9 and C5.

If tube V1 fails, its cathode becomes cold and no plate current flows, thus removing the premagnetization of coil Dr, and the output voltage of the regulating member drops to its lowest value $U_{min}$. The output voltage can therefore never become greater than the required regulated voltage.

In switching on and off, the same situation arises, since then the cathode of tube V1 is heated or cooled.

For the purpose of over-regulation, the output side of the control member is not connected to terminals 3 and 4 of the regulating member but to terminals 1 and 2 or to a point on autotransformer Tr2 between terminals 1 and 3 and terminal 2. The closer one gets to the portion of the winding between 1 and 3 of terminal 1, the greater is the possibility of over-regulation.

While I have described above the principles of my invention in connection with specific apparatus, it is to be clearly understood that this description is made only by way of example and not as a limitation to the scope of my invention.

What is claimed is:

1. An automatic regulator of high regulation accuracy for alternating voltages, including a control member and a regulating member, said control member comprising a multi-electrode glow-discharge tube, a high transformation-ratio transformer having its primary winding connected in series with said tube, means applying the alternating voltage to be controlled across said transformer and tube, a portion of the applied voltage determined by the voltage across said tube being transformed to the secondary side of said transformer, the secondary voltage being equal to the product of the transformation-ratio times said portion of the applied voltage, means for rectifying the voltage across the output of said transformer, means for rectifying the voltage across the output of said tube, and means for comparing said rectified voltages and applying said compared voltages to said regulator, whereby the voltage to be controlled has been amplified by a value essentially equal to the transformation-ratio of the transformer.

2. The regulator according to claim 1, and further comprising a multi-electrode tube controlling the output of said regulating member, means connected in the output of said regulating member for producing an auxiliary voltage, means for rectifying said auxiliary voltage, and circuit means for applying said rectified auxiliary voltage to a control electrode of said regulator tube to effect compensation for very large load fluctuations.

GEZA EMIL BESZEDICS.

No references cited.